United States Patent [19]

Moore

[11] Patent Number: 4,801,170

[45] Date of Patent: Jan. 31, 1989

[54] SUN SCREEN FOR ATTACHMENT TO A VEHICLE WINDSHIELD

[76] Inventor: Franklin A. Moore, Florence, Ariz.

[21] Appl. No.: 109,865

[22] Filed: Oct. 19, 1987

[51] Int. Cl.⁴ .............................................. B60J 3/00
[52] U.S. Cl. ................................ 296/97.5; 248/200.1;
160/DIG. 2; 160/DIG. 3; 160/370.2
[58] Field of Search ................ 296/97 R, 97 G, 97 C,
296/95 C; 248/200.1; 160/DIG. 2, DIG. 3

[56] References Cited

U.S. PATENT DOCUMENTS

| 4,560,245 | 12/1985 | Sarver | 296/95 C |
|---|---|---|---|
| 4,647,102 | 3/1987 | Ebrahimzadeh | 296/97 R |
| 4,671,558 | 6/1987 | Cline | 296/97 R |
| 4,679,842 | 7/1987 | Hwang-change | 296/97 G |

Primary Examiner—Robert R. Song
Attorney, Agent, or Firm—Louise S. Heim

[57] ABSTRACT

A sun screen for blocking light rays and inhibiting heat transfer through the windshield of a vehicle includes a sheet of light-reflective material sized and shaped to conform to the contours of the windshield, and a pair of compression rods for securing the sheet in place. Each compression rod, which is secured to one of the opposing side edges of the sun screen, includes a bottom support element for supporting the screen in a forward corner of the vehicle dashboard, a top gripping element for releasably securing a top corner of the sun screen to a mounting fixture such as the pivot arm of the windshield visor, and a biasing element, such as a spring, for biasing the gripping element away from the support element.

14 Claims, 1 Drawing Sheet

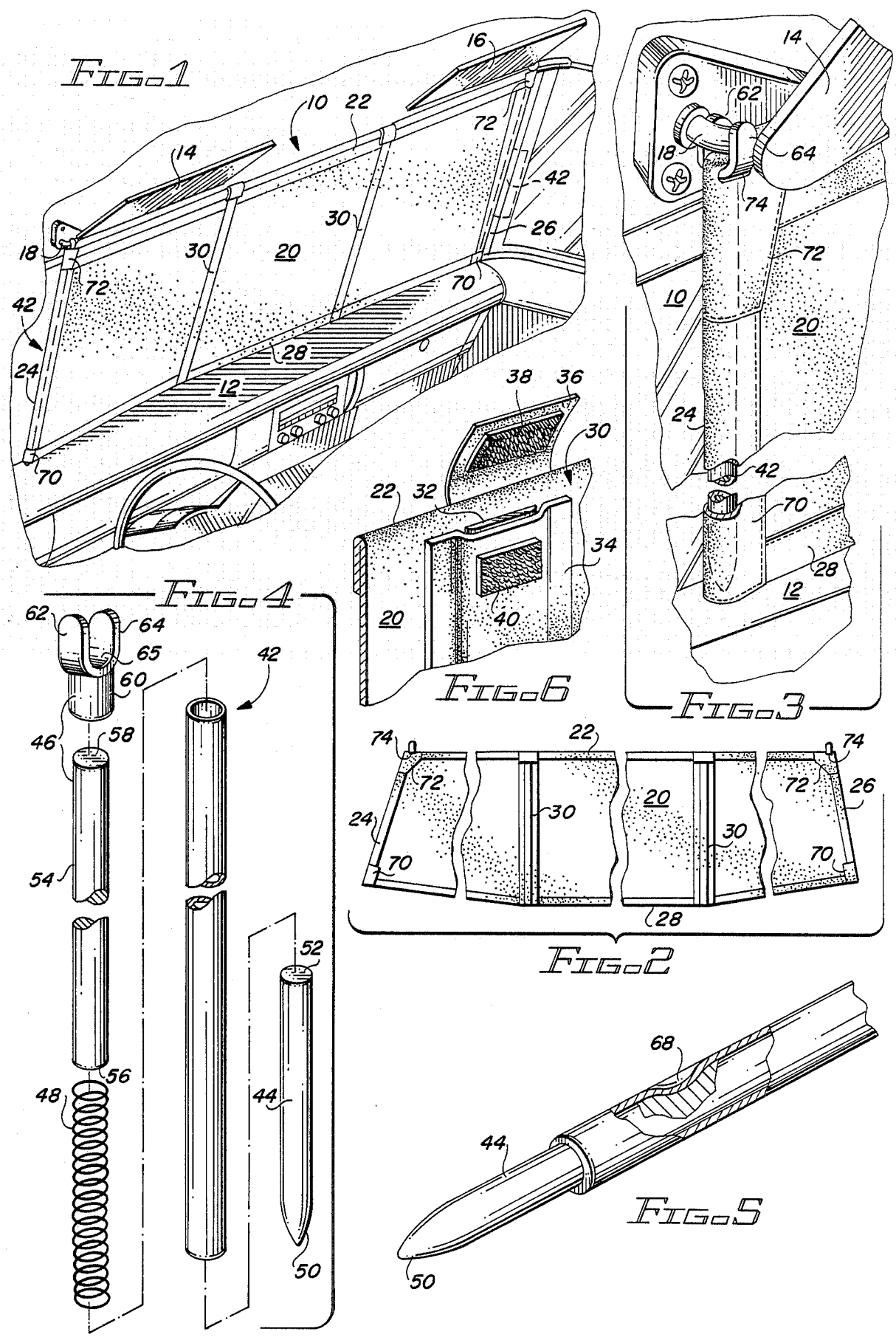

SUN SCREEN FOR ATTACHMENT TO A VEHICLE WINDSHIELD

BACKGROUND OF THE INVENTION

1. Field of the Invention

This invention relates in general to the field of accessories for automotive vehicles, and more particularly to a sun screen for blocking light rays and inhibiting heat transfer through the windshield of an automobile.

2. Description of the Prior Art

The problems associated with heat build-up in the interior of a car or truck which has been parked in the sun are well known to the average vehicle owner. Not only does the high temperature within such a vehicle cause extreme discomfort to the driver and passengers, but it can put an excessive load on the vehicle's air conditioning system, which increases the energy costs, and may ultimately result in malfunctioning of the system. In addition, the heat can cause the dashboard to crack, the upholstery to fade, and other materials within the vehicle to be damaged in a number of different ways.

Many vehicle owners have been able to partially alleviate heat build-up by tinting the side and rear windows of their automobiles with a material that filters out the ultraviolet rays. However, the tinting material interferes with the driver's field of vision, and thus cannot be used in the front windshield. As a result, the tinting of the rear and side windows does little to prevent heat build-up when the vehicle is parked with its front windshield facing the sun.

As a result of the aforementioned problems, numerous vehicular sun screens have recently been introduced into the market. The most common of these sun screens at present is simply an accordion-folded, rectangular sheet of cardboard which is mounted on the dashboard of a vehicle against the interior surface of the windshield. A major drawback of these sun screens, however, is that they do not conform to the contours of the windshield and thus leave numerous gaps through which the rays of light are free to travel. The sun screens are also difficult and time-consuming to install in the windows. In addition, many car owners find the carboard screens unsightly, and thus unsuitable for use in expensive luxury or sports cars.

Other types of sun screens include sheets of fabric or light impervious material which are fastened to or supported against the windshield in various different ways. These types of screens tend to cover the windshield more fully and are more aesthetically appealing than the cardboard screens. However, these screens generally require that some type of mechanical fasteners such as suction cups or adhesive strips be secured to the surface or the edges of the windshield. These fasteners tend to add to the cost and detract from the appearance of the product and can also make the sun screen cumbersome and time-consuming to set up and take down. One representative sun screen of this type is disclosed in U.S. Pat. No. 4,560,245 to Sarver.

A need exists, therefore, for a new and improved sun screen which overcomes some of the shortcomings and problems of the prior art.

SUMMARY OF THE INVENTION

In accordance with the present invention, a new and improved sun screen for attachment to the interior surface of the windshield of a vehicle is provided for blocking light rays and inhibiting heat transfer through the windshield.

The sun screen is formed from a sheet of flexible, light-reflective material which is sized and otherwise configured to substantially match the shape of a windshield. A plurality of vertical stiffening members is provided in the screen for preventing the screen from cupping or otherwise losing shape.

The screen is securely held in place against the windshield by a pair of compression rods inserted in or otherwise attached to the side edges of the screen. Each compression rod includes a bottom support member for supporting a lower corner of the sun screen on the dashboard, an upper gripping member for releasably fastening an upper corner of the sun screen to a mounting fixture such as the pivot arm of a visor above the windshield, and a biasing member, such as a spring, for biasing the lower support member and the upper gripping member away from one another.

In order to install the sun screen, it is simply necessary to place the bottom support members of the compression rods on the upper surface of the dashboard adjacent to the lower corners of the windshield and to press downwardly on the upper portions of the compression rods, compressing the biasing means so that the gripping members clear the visors or other fixtures. Then, the installer removes the downward pressure on the biasing means so that the upper portions of the rods spring upwardly, with the gripping members snapping into engagement with the pivot arm of the visor, or with another suitable mounting fixture. This installation procedure can be completed in a matter of a few seconds. Similarly, to remove the sun screen, it is simply necessary to reverse the steps of the installation procedure. Once removed, the sun screen can conveniently be rolled up and stored in a handy location.

Preferably, the sun shades are individually customized to conform to the different dimensions, shapes and special features of various makes of vehicles. The custom fit enables the shades to extend completely, tautly and smoothly over the inner surface of the windshield, fully blocking out the rays of sunlight and lending an attractive appearance to the vehicle. In addition, the sun screen may be emblazoned with indicia indicating the make and model of the car, or other functional or ornamental material of the ower's choosing. The sun shade may also be employed for other purposes, such as for a privacy curtain preventing passersby from peering into the interior of the car when it is parked.

Accordingly, it is an object of this invention to provide a new, improved sun screen for blocking light rays and inhibiting heat transfer through the windshield of a vehicle.

Another object of the invention is to provide a sun screen which covers the entire inner surface of the windshield and substantially matches the shape of the windshield without cupping or sagging.

Still another object of the invention is to provide a sun screen which can be quickly and easily installed and secured in the interior of a vehicle adjacent the windshield, and removed from the windshield and stored in an equally quick and easy fashion.

The foregoing and other objects of the present invention as well as the invention itself, may be more fully understood from the following description when read in conjunction with the accompanying drawings.

BRIEF DESCRIPTION OF THE DRAWINGS

FIG. 1 is a fragmentary perspective view showing the sun screen of the present invention installed in the windshield of a conventional automotive vehicle.

FIG. 2 is a front view showing the sun screen of the present invention.

FIG. 3 is an enlarged fragmentary perspective view showing how one of the side edges of the sun screen is positioned in the corners of the windshield.

FIG. 4 is a perspective view showing in exploded relation to one another, the elements of a compression rod for holding the sun shade in place.

FIG. 5 is an enlarged fragmentary perspective view, partially broken away, showing the bottom end of a compression rod.

FIG. 6 is an enlarged fragmentary perspective view showing one of the removable stiffening members in the sun screen.

DESCRIPTION OF THE PREFERRED EMBODIMENT

Referring more particularly to the drawings, FIG. 1 shows a fragmentary view of the interior of a typical automotive vehicle including a windshield 10, a dashboard 12, and two visors 14, 16 each visor being mounted above the windshield by means of a pivot arm 18. The sun screen of the present invention, generally indicated by the numeral 20, is mounted against the inner surface of the windshield 10, blocking out rays of ultraviolet light.

The sun screen 20 is formed from a sheet of flexible light-reflective material such as white or light colored polyester, which is sized and otherwise configured to substantially match the shape of the windshield. The shape of the screen may vary somewhat according to the make and model of vehicle for which it is designed. However, typically it will include a straight top edge 22, a pair of opposed side edges 24, 26, and a bottom edge 28 which is generally longer than the top edge 22 and which matches the curved forward edge of the dashboard 12.

In order to prevent the screen 20 from cupping, sagging, or otherwise losing shape, vertical stiffening members 30 are provided at spaced apart intervals at locations intermediate the opposed side edges 24, 26 of the screen 20. Preferably, each stiffening member 30 comprises an elongated strip of semi-rigid material 32 such as a wooden or plastic batten which is removably inserted in an elongated vertical pocket 34 extending from the top edge 22 to the bottom edge 28 of the sun screen as shown in FIG. 6. The pocket 34 preferably also includes a top flap 36 for covering the horizontal opening in which the stiffening strip 32 is received. Suitable fastener means, such as the well known elongated disengagably interlocking fabric strips 38, 40 marketed under the trade name "Velcro", may be provided for releasably fastening the flap 36 to the face of the screen 20. The removability of the reinforcing strips 32 makes the sun screen 20 easy to clean and convenient to roll up and store.

The sun screen 20 is securely held in place against the inner surface of the windshield 10 by a pair of compression rods 42 inserted in or otherwise attached to the side edges 24, 26 of the screen 20. As seen in FIG. 4, each compression rod includes a bottom support member 44 for supporting a lower corner of the sun screen 20 on the dashboard 12, an upper gripping member 46 for releasably fastening an upper corner of the sun screen 20 to a mounting fixture such as the pivot arm 18 of one of the visors 14 above the windshield, and a biasing member, such as a spring 48, for biasing the lower support member 44 and the upper gripping member 46 away from one another. The support member 44 preferably consists of a first rodlike element such as a wooden or plastic dowel, having a tapered bottom end 50 for placement in a forward corner of the dashboard 12, and a flattened top end 52 which acts as a bearing surface for the bottom of the spring 48. The gripping member 46 preferably consists of a second rodlike element 54 such as a wooden or plastic dowel, having a flat bottom surface 56 for bearing the top of spring 48, and a flat top surface 58 on which a yoke piece 60 is mounted. The yoke piece 60, which may be molded from plastic, has a blind bore at its bottom end for receiving the top end 58 of the dowel 54, and is bifurcated at its top end to define two prongs 62, 64, and a crotch 65 for receiving the pivot arm 18 of the visor 14 between the two prongs. Preferably, both the support member 44 and the rodlike portion 54 of the gripping element 46 are telescopically received in a tubular casing member 66 which surrounds and protects spring 48. Means such as a crimp 68 in the casing 66 are provided for preventing longitudinal movement of the bottom support member 44 relative to the casing 66, while the dowel portion 54 of gripping member 46 is free for longitudinal movement within casing 66.

The compression rods 42 may be attached to the side edges of the sun screen 20 in any suitable manner. However, for best results, they should be inserted into side seams which have been created by folding over the side edges 24, 26 of the screen and stitching them to the face of the screen. Preferably, each of the lower corners of the sun screen 20 is covered with a reinforcement member 70 made from a durable material such as vinyl, for preventing the corners from fraying or tearing. Each of the reinforcement members 70 is stitched across the bottom in order to retain bottom support member 44. Similarly, each of the top corners of the sun screen 20 is covered with a reinforcement member 72. Each of the top reinforcement members 72 is provided with horizontal slots 74, through which the prongs 62, 64 of bifurcated yoke piece 60 project. Thus, the top edge of the reinforcement 72 rests in the crotch 65 of the yoke piece, preventing the longitudinal side edges 24, 26 of the screen 20 from sliding relative to the compression rods 42.

In order to install the sun screen 20 in a vehicle windshield, it is simply necessary to place the bottom support members 44 of the compression rod on the upper surface of the dashboard 12 adjacent to the lower corners of the windshield, and to press downwardly on the upper portions of the compression rods 42, compressing the springs 48 so that the gripping members 46 clear the visors 14 or other fixtures. Then the installer removes the downward pressure on the springs 48 so that the gripping members 46 spring upwardly, with the yoke piece 60 snapping into engagement with the pivot arms 18 of the visors 14, or with other suitable mounting fixtures. Similarly, to remove the sun screen 20, it is simply necessary to reverse the steps of the installation procedure. Once removed, the sun screen can conveniently be rolled up and stored in a handy location.

Preferably, the sun shades are individually customized to conform to the different dimensions, shapes, and special features of various makes of vehicles. In addition, the sun screen may be emblazoned with indicia indicating the make and model of the car, or other functional or ornamental material of the owner's choosing.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A sun screen for blocking light rays and inhibiting heat transfer through a vehicle windshield, the sun screen comprising:
   a sheet of flexible, light-reflective material;
   support means for supporting a first edge of said sun screen on a surface of said vehicle near said first edge;
   gripping means for releasably attaching at least a portion of a second edge opposite said first edge of said sun screen to mounting means projecting from a surface of said vehicle near said second edge; and
   biasing means for biasing said gripping means away from said support means and towards said mounting means;
   in which said support means and said gripping means comprise lower and upper ends, respectively, of a compression rod, and said biasing means comprises a compression spring disposed between said lower and upper ends of said compression rod, said gripping means further comprising a yoke piece bifurcated to define two upwardly extending prongs, for receiving said mounting means between said prongs.

2. The sun screen of claim 1, comprising two compression rods, each compression rod being secured to a different edge of said sheet of flexible material.

3. The sun screen of claim 1, in which said sheet of flexible material has a size and shape essentially matching the size and shape of said windshield.

4. The sun screen of claim 1, in which said sun screen further comprises stiffening members for preventing said sun screen from cupping.

5. A sun screen for blocking light rays and inhibiting heat transfer through a vehicle windshield having an inner surface, the sun screen comprising:
   a sheet of flexible, light-reflective material sized and configured to entirely cover and substantially match the shape of the inner surface of said windshield, said sheet having elongated top and bottom edges, a pair of opposed side edges, a pair of upper corners, and a pair of lower corners;
   attachment means for holding said sheet in juxtaposed coextending relationship with the inner surface of said windshield, said attachment means including a plurality of compression rods, each compression rod having a support element for supporting said sun screen on a surface adjacent to said windshield, a gripping element opposite said support member for releasably attaching said sun screen to a mounting fixture near said windshield, and a biasing element for biasing said gripping member away from said support member and towards said mounting fixture;
   stiffening means for preventing cupping of said flexible sheet, said stiffening means comprising a plurality of strips of semi-rigid material, each of said strips extending vertically from the bottom edge to the top edge of said flexible sheet of material; and
   a plurality of vertically extending pockets in said flexible sheet, each pocket having a horizontal opening for removably receiving one of said stiffening strips, flap means for covering said horizontal opening, and releasable fastener means for releasably securing said flap means over said opening.

6. The sun screen of claim 5, further comprising reinforcement means for preventing fraying of the corners of said flexible sheet.

7. The sun screen of claim 6, in which said compression rods are two in number, each compression rod being secured to a different one of said opposed side edges of said sheet of flexible material.

8. A sun screen for blocking light rays and inhibiting heat transfer through a windshield of a vehicle, said windshield having a inner surface including two upper corners and two lower corners, and said vehicle having an interior portion which includes a dashboard angularly disposed to said windshield, the dashboard having two forward corners contiguous to the lower corners of said windshield, and a pair of visors mounted by means of pivot arms near the upper corners of said windshield, said sun screen comprising:
   a sheet of flexible, light-reflective material sized and shaped to essentially match the size and shape of said windshield, said sheet having elongated top and bottom edges, a pair of opposed side edges, a pair of upper corners and a pair of lower corners; and
   attachment members secured to each of said opposed side edges of said sheet for holding said sheet in juxtaposed coextending relationship with the inner surface of said windshield, each attachment member consisting of a compression rod having a support element for supporting the bottom edge of said sun screen on said dashboard, a gripping element opposite said support member for releasably attaching an upper corner of said sun screen to the pivot arm of one of said visors, and a biasing element for biasing said gripping element away from said support element and towards said pivot arm.

9. The sun screen of claim 8, in which the support element of each compression rod comprises a first elongated dowel having a bearing surface at one end carrying said biasing element, and a point at the opposite end for placement in one of the forward corners of said dashboard.

10. The sun screen of claim 9, in which said gripping element of each compression rod comprises:
   a second elongated dowel having a bearing surface at one end for carrying said biasing element; and pl a yoke piece attached to the opposite end of said dowel, said yoke piece being bifurcated to define two prongs and a crotch for receiving the pivot arm between the two prongs.

11. The sun screen of claim 10, in which said biasing element of each compression rod comprises a compresson spring extending vertically between said first and second elongated dowels and having two opposing ends, one end being carried by the bearing surface of said first dowel, and the other end being carried by the bearing surface of said second dowel.

12. The sun screen of claim 11, in which each of said compression rods further comprises a tubular casing surrounding said compression spring and telescopingly receiving said first dowel means.

13. The sun screen of claim 12, further comprising means for preventing relative motion between said tubular casing and said second elongated dowel.

14. The sun screen of claim 13, in which said means for preventing relative motion comprises a crimp in said casing.

* * * * *